United States Patent
Schuling

(10) Patent No.: US 10,479,285 B2
(45) Date of Patent: Nov. 19, 2019

(54) LID ASSEMBLIES FOR STORAGE CONTAINERS INCLUDING VIBRATION DAMPING SUBSTRATES

(71) Applicant: Dee Zee, Inc., Des Moines, IA (US)

(72) Inventor: Eric Schuling, Bondurant, IA (US)

(73) Assignee: Dee Zee, Inc., Des Moines, IA (US)

( * ) Notice: Subject to any disclaimer, the term of this patent is extended or adjusted under 35 U.S.C. 154(b) by 0 days.

(21) Appl. No.: 15/794,730

(22) Filed: Oct. 26, 2017

(65) Prior Publication Data

US 2018/0118128 A1    May 3, 2018

Related U.S. Application Data

(60) Provisional application No. 62/414,040, filed on Oct. 28, 2016.

(51) Int. Cl.
| | |
|---|---|
| *B60R 9/06* | (2006.01) |
| *B65D 45/16* | (2006.01) |
| *B65D 55/14* | (2006.01) |
| *F16F 15/02* | (2006.01) |
| *F16F 15/10* | (2006.01) |
| *B60R 11/00* | (2006.01) |

(52) U.S. Cl.
CPC .............. *B60R 9/065* (2013.01); *B65D 45/16* (2013.01); *B65D 55/14* (2013.01); *F16F 15/02* (2013.01); *F16F 15/10* (2013.01); *B60R 2011/004* (2013.01)

(58) Field of Classification Search
CPC .... B60R 9/065; B60R 2011/004; F16F 15/02; G10K 11/168
See application file for complete search history.

(56) References Cited

U.S. PATENT DOCUMENTS

| | | | | |
|---|---|---|---|---|
| 3,658,635 | A * | 4/1972 | Eustice .................. | B32B 27/00 428/425.8 |
| 5,484,092 | A * | 1/1996 | Cheney ..................... | B60R 7/14 206/317 |
| 5,743,586 | A * | 4/1998 | Nett ....................... | B60J 7/1621 296/100.02 |
| 6,431,633 | B1 * | 8/2002 | Young ..................... | B60J 7/102 296/100.02 |
| 6,889,417 | B2 | 5/2005 | Jones et al. | |
| 7,168,590 | B2 | 1/2007 | Jones et al. | |
| 2001/0032848 | A1 | 10/2001 | Jones et al. | |
| 2003/0102322 | A1 * | 6/2003 | Jones ....................... | B65D 7/22 220/836 |

(Continued)

FOREIGN PATENT DOCUMENTS

FR    2698059 A1    5/1994

OTHER PUBLICATIONS

International Search Report & Written Opinion pertaining to Application No. PCT/US2017/058485 filed Oct. 26, 2017.

*Primary Examiner* — Adam J Waggenspack
(74) *Attorney, Agent, or Firm* — Dinsmore & Shohl LLP

(57) ABSTRACT

A lid assembly for a storage container includes an outer panel having an inner facing surface and a reinforcement panel extending parallel to the outer panel. The outer panel includes an out-facing surface in opposition to the inner facing surface of the outer panel. A first vibration damping substrate is coupled to the inner facing surface of the outer panel. A second vibration damping substrate is coupled to the out-facing surface of the reinforcement panel.

20 Claims, 5 Drawing Sheets

(56) References Cited

U.S. PATENT DOCUMENTS

| | | | |
|---|---|---|---|
| 2004/0087721 A1* | 5/2004 | Bruhn | C08L 23/0869 525/132 |
| 2004/0219322 A1* | 11/2004 | Fisher | B32B 15/06 428/40.1 |
| 2008/0017679 A1* | 1/2008 | Leblanc | B60R 9/055 224/328 |
| 2009/0266015 A1* | 10/2009 | Schield | B32B 17/10045 52/204.62 |
| 2010/0324204 A1* | 12/2010 | Kawaguchi | C08L 23/0853 524/582 |
| 2013/0284780 A1* | 10/2013 | Beckwith | B60R 7/14 224/401 |
| 2014/0335314 A1* | 11/2014 | Aldino | F16L 59/065 428/159 |
| 2015/0129626 A1* | 5/2015 | Malin | B60R 9/065 224/404 |
| 2015/0321336 A1* | 11/2015 | Harrison | B25H 3/02 206/349 |

\* cited by examiner

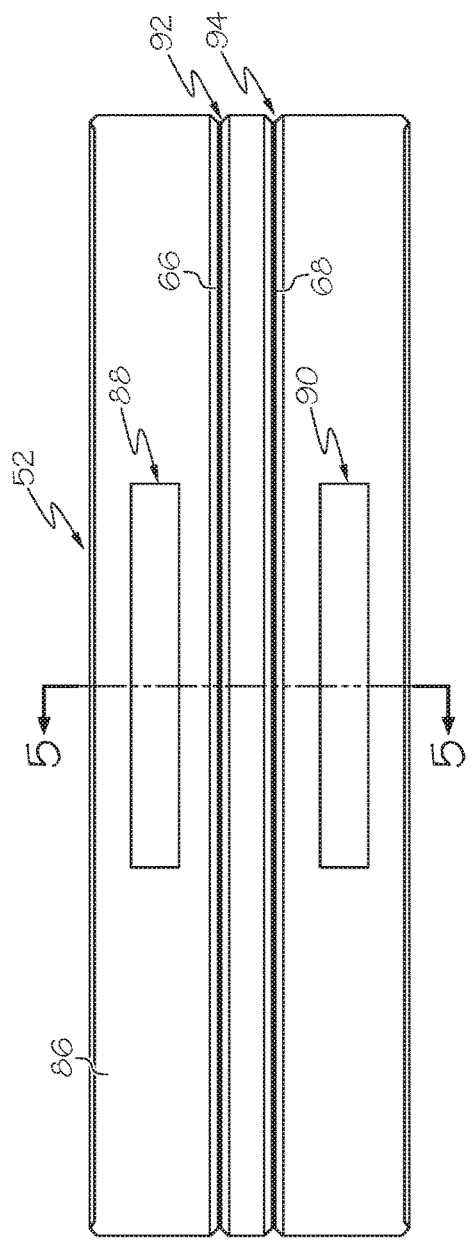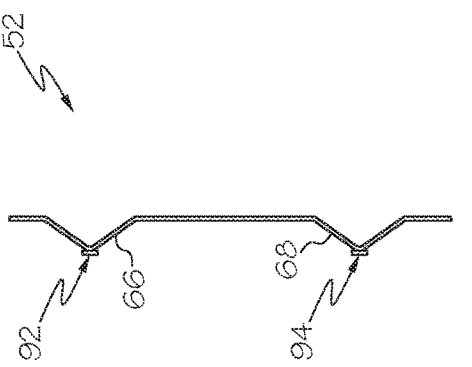

LID ASSEMBLIES FOR STORAGE CONTAINERS INCLUDING VIBRATION DAMPING SUBSTRATES

CROSS-REFERENCE TO RELATED APPLICATION

The present application claims priority it U.S. Provisional Application 62/414,040 filed Oct. 28, 2016, the entirety of which is incorporated by reference herein in its entirety.

TECHNICAL FIELD

The present specification generally relates to storage containers and methods for forming the same and, more specifically, to vehicle storage containers with lid assemblies that include vibration damping substrates.

BACKGROUND

Storage containers come in all shapes and sizes. Some storage containers are designed specifically to be installed in a rear bed of a vehicle, namely a truck. Such storage containers are often assembled by a manufacturer at a plant and are then shipped to consumers or to retail locations. Often these storage containers are formed of a number of metal sheets that are prone to vibration and sounds resulting from those vibrations. One area of interest in controlling sound is at the lid assemblies of the storage containers. Closing the lid assemblies can result in vibration related noises. Additionally, the lid assemblies, along with the remaining exterior of the storage containers are often coated and cured under elevated temperatures. These curing temperatures can limit the types of materials that are used in producing the lid assemblies.

Accordingly, a need exists for storage container designs that control vibration related noise when closing their lid assemblies. Another need exists for a vibration damping substrate that can be applied to a lid assembly of a storage container that can withstand temperatures of a powder coating process when coating the storage container.

SUMMARY

In one embodiment, a lid assembly for a storage container includes an outer panel having an inner facing surface and a reinforcement panel extending parallel to the outer panel. The outer panel includes an out-facing surface in opposition to the inner facing surface of the outer panel. A first vibration damping substrate is coupled to the inner facing surface of the outer panel. A second vibration damping substrate is coupled to the out-facing surface of the reinforcement panel.

In another embodiment, a lid assembly for a storage container includes and outer panel having an inner facing surface and a reinforcement panel extending parallel to the outer panel. The reinforcement panel includes an out-facing surface in opposition to the inner facing surface of the outer panel, and one or more reinforcement grooves extending out of a plane of the reinforcement panel and defining outboard pockets of space between the outer panel and the reinforcement panel. A first vibration damping substrate is coupled to the inner facing surface of the outer panel within one of the outboard pockets of space. A second vibration damping substrate is coupled to the out-facing surface of the reinforcement panel with one of the outboard pockets of space.

A sealant strip is located at an apex of the one or more reinforcement grooves between the reinforcement panel and the out panel.

In another embodiment, a method of forming a storage container includes assembling a lid assembly. Assembling the lid assembly includes coupling a first vibration damping substrate to an inner facing surface of an outer panel of the lid assembly. Coupling a second vibration damping substrate to an out-facing surface of a reinforcement panel of the lid assembly, and coupling the outer panel of the lid assembly to the reinforcement panel of the lid assembly so that the inner facing surface of the outer panel opposes the out-facing surface of the reinforcement panel. The method further includes coupling the lid assembly to a base portion, wherein the base portion defines an interior of the storage container.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 4 depicts a bottom view of a reinforcement panel of the lid assembly of FIG. 2, according to one or more embodiments shown and described herein;

FIG. 5 depicts a section view of the reinforcement panel along line 5-5 of FIG. 4, according to one or more embodiments shown and described herein;

DETAILED DESCRIPTION

Embodiments disclosed herein are directed to storage containers, such as truck tool boxes, including lid assemblies that include vibration damping substrates. The vibration damping substrates can be used to deaden vibrations of sheet metal due to opening and closing of the lid assemblies, which can improve the sound and feel of the lid assemblies to a user. The vibration damping substrates may be a constrained layer damper that includes multiple layers including a visco-elastic polymer material that is adhered directly to a sheet metal panel of the lid assembly to reduce lid vibrations when the lid is opened and closed.

Figure 1:
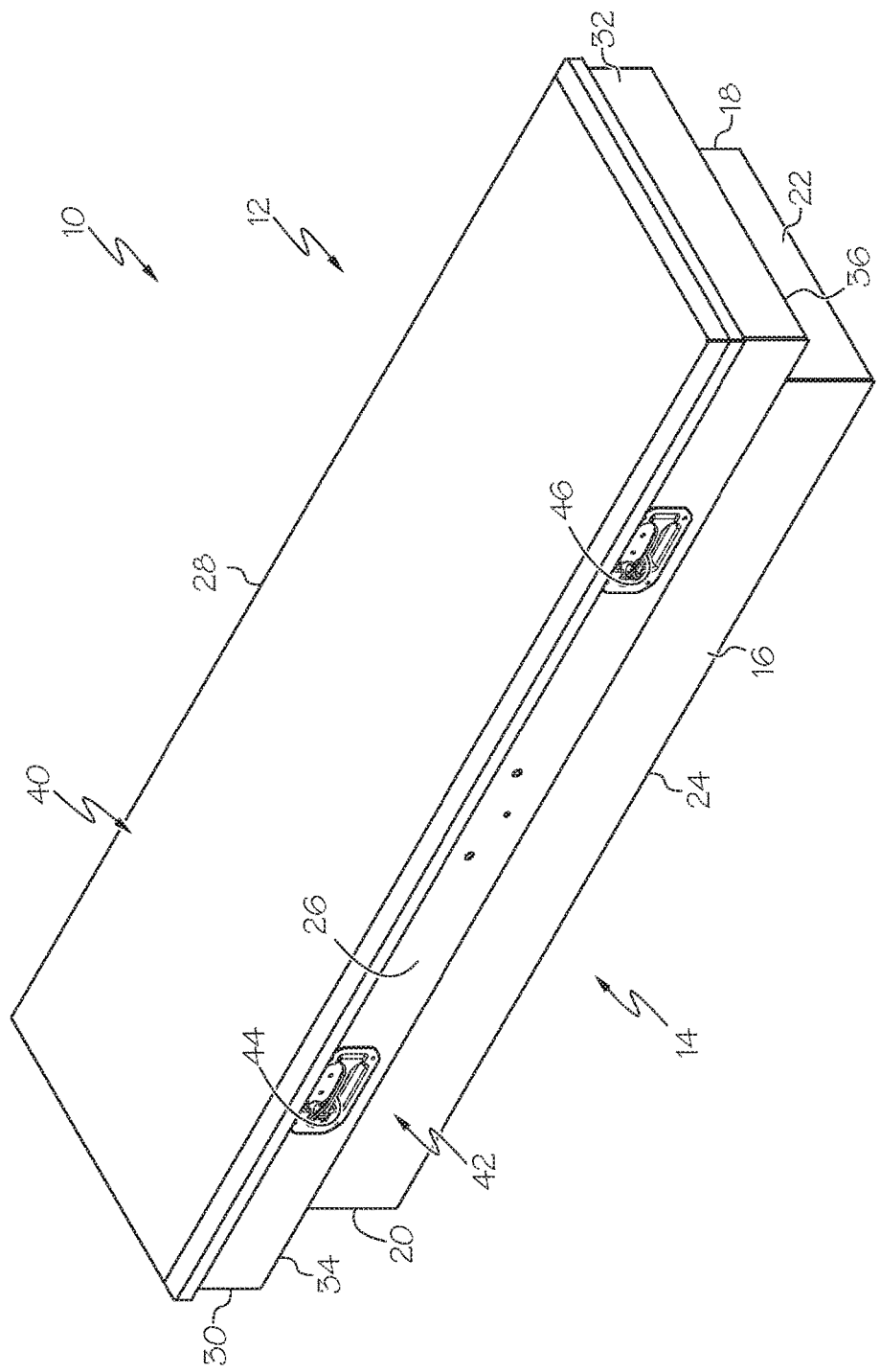
FIG. 1 depicts a perspective view of a storage container, according to one or more embodiments shown and described herein.

Referring to FIG. 1, a storage container 10 (e.g., a truck tool box) includes a base portion 14 and an extending portion 12. In embodiments where the storage container 10 is a truck tool box, the base portion 14 is sized to fit between opposite truck bed side rails of a bed of a truck and the extending portion 12 is sized to extend beyond the base portion in at least a vehicle lateral direction (side-to-side) and over the opposite side rails to be supported thereon and/or attached thereto. In some embodiments, the extending portion 12 also extends beyond the base portion 14 in a vehicle longitudinal direction (front-to-back).

The base portion 14 includes upstanding walls, including a front facing wall 16, a rear facing wall 18, and side walls 20 and 22 that extend between the front facing wall 16 and the rear facing wall 18. In some embodiments, the base portion 14 also has a floor 24 that rests against an upper surface of the truck bed. The walls 16, 18, 20 and 22 may be formed of any suitable material such as sheet metal (e.g., steel). The upper or extending portion 12 also includes a front facing wall 26, a rear facing wall 28, and side walls 30 and 32 that extend between the front facing wall 26 and the rear facing wall 18. Bottom walls 34 and 36 may extend outwardly from the base portion 14 to the side walls 30 and 32. The walls 26, 28, 30, 32, 34 and 36 may also be formed of any suitable material, such as sheet metal (e.g., steel).

A lid assembly 40 is provided on the extending portion 12. The lid assembly 40 is used to close an access opening that provides access to an interior of the storage container 10. A closure system (generally referred to as element 42) may be provided that includes handles 44 and 46 that can be used to latch the lid assembly 40 in the illustrated closed configuration. In some embodiments, a locking device may be provided that can be used to lock the lid assembly 40 in the closed configuration to prevent access to the interior of the storage container 10.

Figure 2:
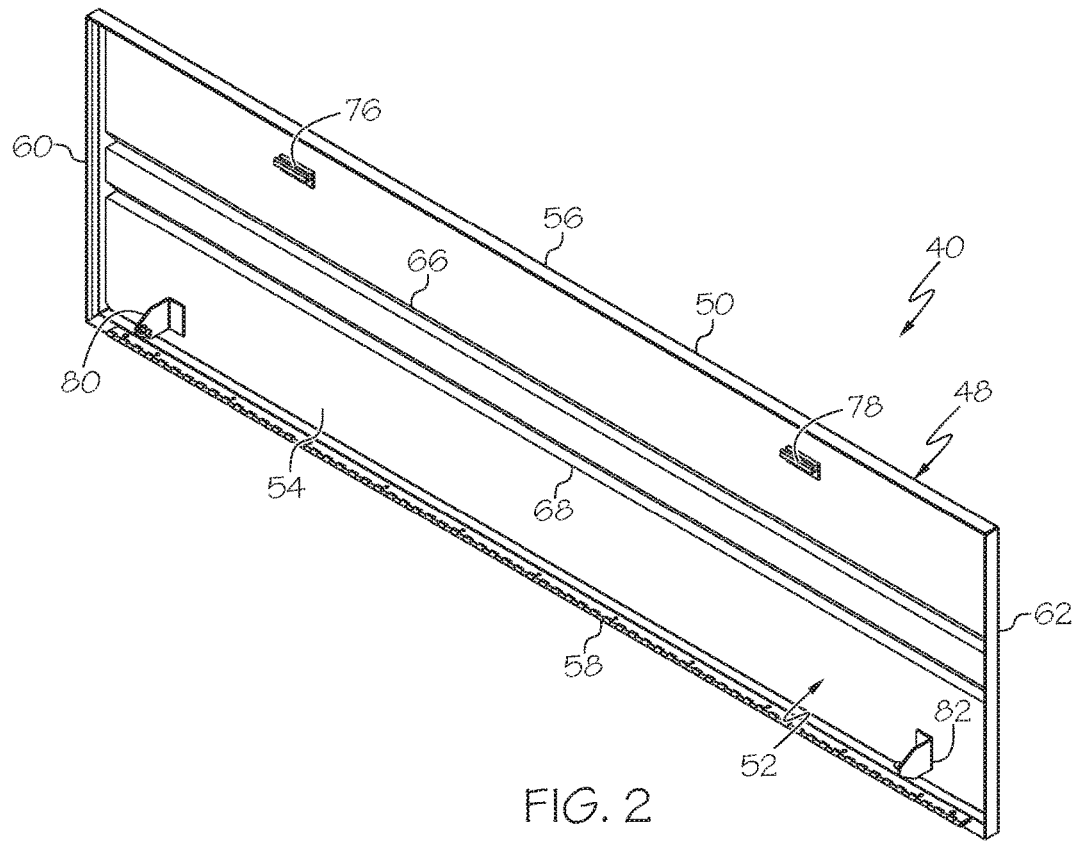
FIG. 2 depicts a perspective view of a lid assembly for use with the storage container of FIG. 1, according to one or more embodiments shown and described herein.
Figure 3:
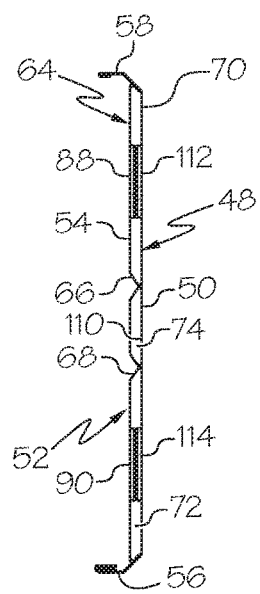
FIG. 3 depicts a section view of the lid assembly along line 3-3 of FIG. 2, according to one or more embodiments shown and described herein.

Referring to FIGS. 2 and 3, the lid assembly 40 can be a multi-panel construction and can include an outer panel 48, which provides an exterior surface 50 and an interior reinforcement panel 52 that reinforces the outer panel 48 and provides an interior surface 54. The outer panel 48 includes a front facing edge 56, a rear facing edge 58 and side edges 60 and 62 that extend between the front facing edge 56 and the rear facing edge 58. The edges 56, 58, 60 and 62 extend outwardly away from the exterior surface 50 and form an enclosure volume 64 into which the reinforcement panel 52 can be inserted and connected to the outer panel 48 in a face-to-face fashion.

The reinforcement panel 52 may include V-shaped reinforcement grooves 66 and 68 that extend continuously across a width of the reinforcement panel 52. As can be best seen by FIG. 3, the reinforcement grooves 66 extend out of the plane of the reinforcement panel 52 and can contact the outer panel 48 for added rigidity. The reinforcement grooves 66 and 68 also create space between the outer panel 48 and the reinforcement panel 52 forming outboard pockets 70 and 72 and a narrower inboard pocket 74 located between the reinforcement grooves 66 and 68. The reinforcement panel 52 may also include striker mounts 76 and 78 for use with the closure system 42 and gas shock mounts 80 and 82 that can be used to mount the lid assembly 40 to gas shocks, which are used in controlling movement of the lid assembly 40. The reinforcement panel 52 may be connected to the outer panel 48 using any suitable process, such as stitch welding along all of the edges 56, 58, 60 and 62.

FIG. 4 illustrates an out-facing surface 86 of the reinforcement panel 52. The reinforcement panel 52 includes vibration damping substrates 88 and 90. The vibration damping substrate 88 is located to an outside of the reinforcement groove 66 and the vibration damping substrate 90 is located to an outside of the reinforcement groove 68. The vibration damping substrates 88 and 90 are each formed as elongated strips that extend along a width (e.g., at least about 10 percent of the width, such as at least about 20 percent, such as at least about 30 percent, such as at least about 40 percent, such as at least about 50 percent, such as at least about 60 percent, such as at least about 70 percent, such as at least about 80 percent, such as at least about 90 percent, such as at least about 100 percent, such as between about 10 percent and about 70 percent) of the reinforcement panel 52.

FIG. 5 depicts a partial section view of the reinforcement panel 52 illustrated in FIG. 4, including the reinforcement grooves 66 and 68. In some embodiments, sealant strips 92 and 94 are located at the apex of each reinforcement groove 66 and 68, which can provide a seal against the outer panel 48 (FIG. 3). Such sealant strips may be made from any material suitable for forming a seal between the outer panel 48 and the reinforcement panel 52, for example, isobutylene. The sealant strips 92, 94 may each be formed as elongated strips that extend along a width (e.g., at least about 10 percent of the width, such as at least about 20 percent, such as at least about 30 percent, such as at least about 40 percent, such as at least about 50 percent, such as at least about 60 percent, such as at least about 70 percent, such as at least about 80 percent, such as at least about 90 percent, such as at least about 100 percent, such as between about 10 percent and about 70 percent) of the reinforcement panel 52. In some embodiments, there may not be sealant strips 92, 94.

Figure 6:
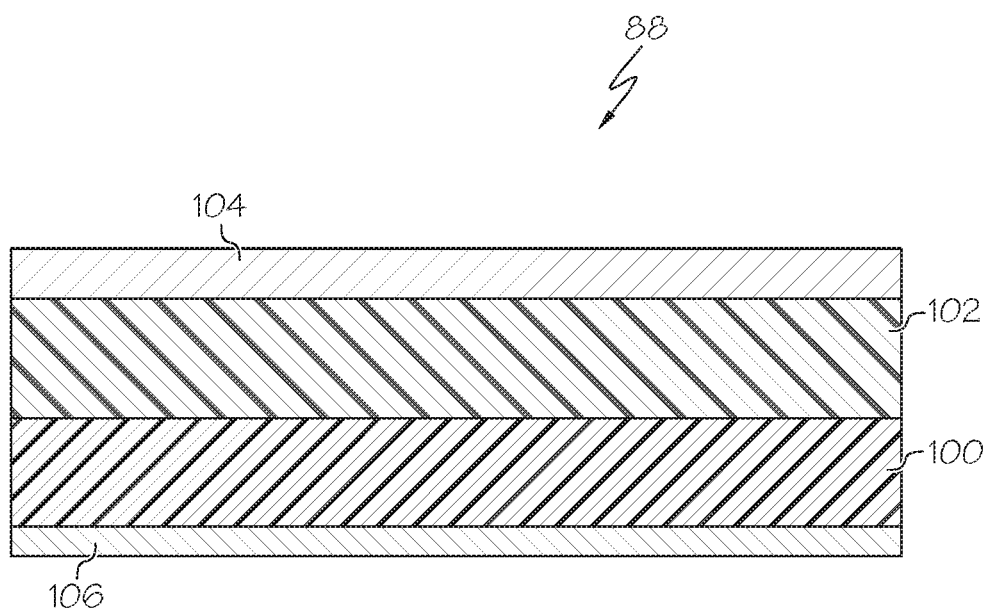
FIG. 6 depicts a section view of a vibration damping substrate, according to one or more embodiments shown and described herein.

Referring to FIG. 6, the vibration damping substrates 88 and 90 (only vibration damping substrate 88 is shown) may be a multi-layer structure including a base layer 100 of an elastomeric material and an outer layer 102 that may also be a polymeric material having a higher stiffness than the base layer. The base layer 100 and outer layer 102 may be co-extruded and a top layer 104, such as an aluminum foil or a glass cloth may be applied to the outer layer 102. The base layer 100 may include tackifying agents that adhere to the material of the reinforcement panel 52. A release layer 106 may be applied to the base layer 100 that can be readily removed to expose the tacky base layer 100. Each of the layers can have a thermal resistance that can withstand the temperatures of the powder coating process (e.g., up to 200° C. or more).

Figure 7:
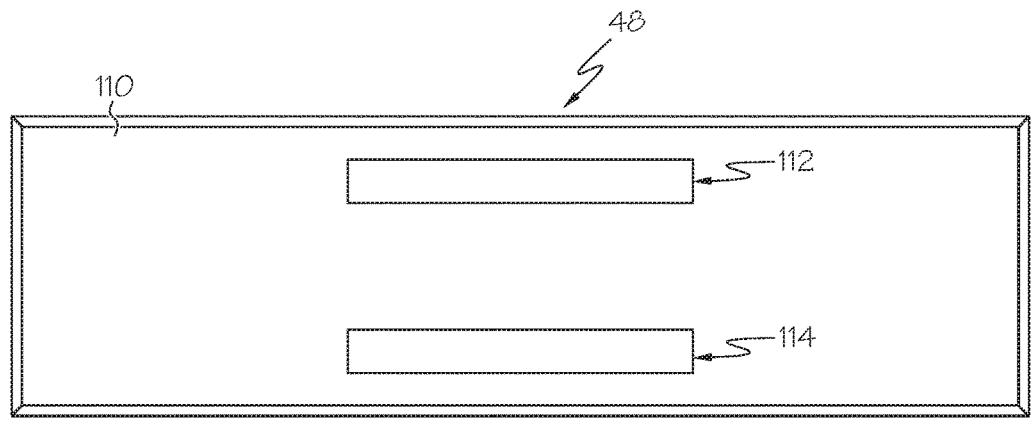
FIG. 7 depicts a bottom view of an outer panel for use with the lid assembly of FIG. 2, according to one or more embodiments shown and described herein.

Referring to FIG. 7, an inner facing surface 110 of the outer panel 48 is shown. The outer panel 48 may also include vibration damping substrates 112 and 114. The vibration damping substrates 112 and 114 are each formed as elongated strips that extend along a width (e.g., at least about 10 percent of the width, such as at least about 20 percent, such as at least about 30 percent, such as at least about 40 percent, such as at least about 50 percent, such as at least about 60 percent, such as at least about 70 percent, such as at least about 80 percent, such as at least about 90 percent, such as at least about 100 percent, such as between about 10 percent and about 70 percent) of the outer panel 48. The vibration damping substrates 112 and 114 may have a similar construction to that described in regards to the vibration damping substrates 88 and 90.

Referring briefly back to FIG. 3, the vibration damping substrates 88, 90, 112, 114 may be located within the outboard pockets 70 and 72 opposite one another in a face-to-face relationship. In some embodiments, the opposing vibration damping substrates may abut one another. In some embodiments, and as illustrated in FIG. 3, the vibration damping substrates 88, 90, 112, and 114 may be spaced apart from one another such that there is a gap between the vibration damping substrates 88, 90 coupled to the out-facing surface 86 of the reinforcement panel 52 and the vibration damping substrates 112, 114 coupled to the inner facing surface 110 of the outer panel 48. Moreover, the vibration damping substrates 88, 90 coupled to the out-facing surface 86 of the reinforcement panel 52 and the vibration damping substrates 112, 114 coupled to the inner facing surface 110 of the outer panel 48 need not be positioned so as to be directly opposing each other. Instead, the vibration damping substrates 88, 90 coupled to the out-facing surface 86 of the reinforcement panel 52 and the vibration damping substrates 112, 114 coupled to the inner facing surface 110 of the outer panel 48 may be staggered. It should also be noted that while four vibration damping substrates are described above, there may be more or less than four vibration damping substrates depending, for example, on the dimensions and shape of the storage container.

Figure 8:
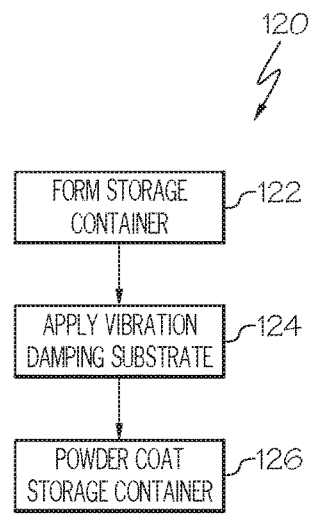
FIG. 8 depicts a method of forming the storage container of FIG. 1, according to one or more embodiments shown and described herein.

Referring to FIG. 8, a method 120 of damping the lid assembly 40 using the vibration damping substrates (e.g., 88, 90, 112, and/or 114) is illustrated. At step 122, the body of the storage container is formed using various sheet metal panels, as described herein, and other components, such as the closure system. The lid assembly 40 may not be completely assembled at this point to allow for the application of one or more vibration damping substrates (e.g., 88, 90, 112, and/or 114). For example, at step 124, the vibration damping substrates (e.g., 88, 90, 112, and/or 114) may be applied to the outer panel 48 and/or the reinforcement panel 52 of the lid assembly 40, as described above, at a location between the outer panel 48 and the reinforcement panel 52. For example a first vibration damping substrate (e.g., 112) may be coupled to an inner facing surface 110 of the outer panel 48 of the lid assembly 40. A second vibration damping substrate (e.g., 88) may be coupled to an out-facing surface 86 of the reinforcement panel 52. Once the vibration damping substrates are in place, the outer panel 48 of the lid assembly 40 is coupled to the reinforcement panel 52 of the lid assembly 40 so that the inner facing surface 110 of the outer panel 48 opposes the out-facing surface 86 of the reinforcement panel 52. The lid assembly 40 may then be coupled to the base portion 14.

Once assembled, the storage container 10 may be powder coated at step 126. The vibration damping substrates (e.g., 88, 90, 112, and/or 114) are non-curing and have a thermal resistance that can withstand the temperatures of the powder coating process (e.g., up to 200° C. or more) without damage to the vibration damping substrates (e.g., 88, 90, 112, and/or 114). This can allow for application of the vibration damping substrates (e.g., 88, 90, 112, and/or 114) before the powder coating process, which can reduce manufacture time and complexity.

It should now be understood that embodiments of the present disclosure are directed toward storage containers, such as truck tool boxes, that include lid assemblies that include vibration damping substrates. The vibration damping substrates can be used to deaden vibrations of sheet metal due to opening and closing of the lid assemblies, which can improve the sound and feel of the lid assemblies to a user. The vibration damping substrates may be a constrained layer damper that includes multiple layers including a visco-elastic polymer material that is adhered directly to a sheet metal panel of the lid assembly to reduce lid vibrations when the lid is opened and closed.

It will be apparent to those skilled in the art that various modifications and variations can be made to the embodiments described herein without departing from the spirit and scope. Thus it is intended that the embodiments described herein cover any modifications and variations provided they come within the scope of the appended claims and their equivalents.

What is claimed is:

1. A lid assembly for a storage container, comprising:
an outer panel comprising an inner facing surface;
a reinforcement panel extending parallel to the outer panel and comprising an out-facing surface in opposition to the inner facing surface of the outer panel, the reinforcement panel being unopenably attached in parallel to the outer panel with the outer panel in both open and closed positions;
a first vibration damping substrate affixed to the inner facing surface of the outer panel and not affixed to the out-facing surface of the reinforcement panel or any structure between the first vibration damping substrate and the outfacing surface of the reinforcement panel; and
a second vibration damping substrate affixed to the out-facing surface of the reinforcement panel opposite from the first vibration damping substrate such that a cross-section of the lid assembly taken perpendicular to a plane of the out-facing surface of the reinforcement panel extends through both the first vibration damping substrate and the second vibration damping substrate.

2. The lid assembly of claim 1, wherein the reinforcement panel comprises one or more reinforcement grooves extending out of a plane of the reinforcement panel and defining outboard pockets of space between the outer panel and the reinforcement panel, wherein the first vibration damping substrate and the second vibration damping substrate are positioned within at least one of the outboard pockets of space.

3. The lid assembly of claim 1, wherein at least one of the first vibration damping substrate and the second vibration damping substrate comprise a multi-layer structure comprising a base layer and an outer layer.

4. The lid assembly of claim 3, wherein the outer layer comprises a higher stiffness than the base layer.

5. The lid assembly of claim 1, wherein the first and second vibration damping substrates comprise a non-curing thermal resistant material capable of withstanding temperatures of at least 200° C. without damage.

6. The lid assembly of claim 1, further comprising a third vibration damping substrate coupled to the inner facing surface of the outer panel and a fourth vibration damping substrate coupled to the out-facing surface of the inner panel.

7. The lid assembly of claim 1, wherein the first vibration damping substrate is adhered to the inner facing surface of the outer panel and is not adhered to the out-facing surface of the reinforcement panel.

8. A lid assembly for a storage container, comprising:
an outer panel comprising an inner facing surface;
a reinforcement panel extending parallel to the outer panel and comprising:
an out-facing surface in opposition to the inner facing surface of the outer panel; and one or more reinforcement grooves extending out of a plane of the reinforcement panel and defining outboard pockets of space between the outer panel and the reinforcement panel;

a first vibration damping substrate coupled to the inner facing surface of the outer panel within one of the outboard pockets of space;

a second vibration damping substrate coupled to the out-facing surface of the reinforcement panel within one of the outboard pockets of space, wherein the first vibration damping substrate and the second vibration damping substrate are spaced from one another in a direction perpendicular to a plane of the outfacing surface of the reinforcement panel with open space between the first vibration damping substrate and the second vibration damping substrate; and a sealant strip located at an apex of the one or more reinforcement grooves between the reinforcement panel and the outer panel to provide a seal between the one or more reinforcement grooves and the outer panel.

9. The lid assembly of claim 8, wherein at least one of the first vibration damping substrate and the second vibration damping substrate comprise a multi-layer structure comprising a base layer and an outer layer.

10. The lid assembly of claim 9, wherein the outer layer comprises a higher stiffness than the base layer.

11. The lid assembly of claim 8, wherein the first and second vibration damping substrates comprise a non-curing thermal resistant material capable of withstanding temperatures of at least 200° C. without damage.

12. The lid assembly of claim 8, wherein the sealant strip is in contact with the outer panel.

13. The lid assembly of claim 8, further comprising a third vibration damping substrate coupled to the inner facing surface of the outer panel and a fourth vibration damping substrate coupled to the out-facing surface of the inner panel.

14. The lid assembly of claim 8, wherein the first vibration damping substrate is adhered to the inner facing surface of the outer panel and is not adhered to the out-facing surface of the reinforcement panel.

15. The lid assembly of claim 8, wherein the first vibration damping substrate and the second vibration damping substrate are adhesively coupled to the outer panel and the reinforcement panel, respectively.

16. A method of producing a storage container comprising:

assembling a lid assembly, comprising:

affixing a first vibration damping substrate to an inner facing surface of an outer panel of the lid assembly;

affixing a second vibration damping substrate to an out-facing surface of a reinforcement panel of the lid assembly opposite from the first vibration damping substrate such that a cross-section of the lid assembly taken perpendicular to a plane of the out-facing surface of the reinforcement panel extends through both the first vibration damping substrate and the second vibration damping substrate; and subsequently unopenably coupling the outer panel of the lid assembly to the reinforcement panel of the lid assembly so that the inner facing surface of the outer panel opposes the out-facing surface of the reinforcement panel, such the first vibration damping substrate is not affixed to the out-facing surface of the reinforcement panel or any structure between the outfacing surface of the reinforcement panel and the first vibration damping substrate; and coupling the lid assembly to a base portion, wherein the base portion defines an interior of the storage container.

17. The method of claim 16, further comprising powder coating the assembled lid assembly.

18. The method of claim 16, wherein the reinforcement panel comprises one or more reinforcement grooves extending out of a plane of the reinforcement panel and defining outboard pockets of space between the outer panel and the reinforcement panel.

19. The method of claim 18, further comprising applying a sealant strip to an apex of the one or more reinforcement grooves between the reinforcement panel and the outer panel.

20. The method of claim 18, wherein the first vibration damping substrate and the second vibration damping substrate are positioned within at least one of the outboard pockets of space.

* * * * *